United States Patent Office.

GEORGE A. PATTON, OF ALTOONA, PENNSYLVANIA.

COUGH REMEDY.

SPECIFICATION forming part of Letters Patent No. 384,466, dated June 12, 1888.

Application filed March 10, 1888. Serial No. 266,794. (No specimens.)

*To all whom it may concern:*

Be it known that I, GEORGE A. PATTON, a resident of Altoona, in the county of Blair and State of Pennsylvania, have invented certain new and useful Improvements in Cough Remedies; and I do hereby declare the following to be a full, clear, and exact description of the invention, such as will enable others skilled in the art to which it pertains to make and use the same.

My invention consists in a combined confection and medical compound for the amelioration and treatment of coughs, colds, hoarseness, and sore throat.

The compound embraces the following ingredients, combined in about the proportions stated: elecampane, hoarhound, lovage, wild cherry, sugar, glycerine, anise-seed, and paregoric. In preparing this new remedy, take of elecampane-root (*Inula*) ten ounces, hoarhound-tops (*Marrubium*) six ounces, lovage-root (*Ligusticum levisticum*) ten ounces, wild-cherry bark (*Prunus Virginiana*) eight ounces, and place the same in a suitable vessel containing about fifteen quarts of water, and boil thoroughly until all the virtue is extracted from the ingredients. The vessel is then taken from the fire and the liquid strained, so as to remove all sediment, after which add about one hundred and thirteen pounds of sugar. The mixture is again boiled and frequently stirred until the sugar has entirely dissolved. While the mixture is cooling add twenty-two ounces of glycerine, twelve ounces of anise-seed, and twelve ounces of paregoric, constantly stirring, so as to completely incorporate all the ingredients.

A cough preparation thus made is not only agreeable and palatable, but very efficacious in the treatment of coughs and colds and the allaying of all irritations of the throat, and is very soothing and healing.

Having thus described my invention, what I claim as new, and desire to secure by Letters Patent, is—

The herein-described medical compound, consisting of elecampane, hoarhound, lovage, wild cherry, sugar, glycerine, anise-seed, and paregoric, for the purposes specified.

In testimony whereof I have signed this specification in the presence of two subscribing witnesses.

GEORGE A. PATTON.

Witnesses:
 ROBT. JOHNSON,
 P. N. MARKS.